United States Patent
Charles et al.

(10) Patent No.: US 12,372,175 B2
(45) Date of Patent: Jul. 29, 2025

(54) CLAMP ASSEMBLY

(71) Applicant: MACLEAN-FOGG COMPANY, Mundelein, IL (US)

(72) Inventors: Stephen Michael Charles, Warren, MI (US); Steven Todd Wanamaker, Shelby Township, MI (US); Kyle Mitchell Kapa, Casco, MI (US); Kenneth James Rimatzki, Harrison Township, MI (US); Mackenzie Elaine Visga, Port Huron, MI (US); James Paul Fortener, Southgate, MI (US); David Lawrence Dewitte, Chesterfield, MI (US); Cathryn Ann Guest, Rochester Hills, MI (US); Christopher Lawrence Demoff, Attica, MI (US); Scott Andrew Morgan, Macomb, MI (US)

(73) Assignee: Maclean-Fogg Company, Mundelein, IL (US)

( * ) Notice: Subject to any disclaimer, the term of this patent is extended or adjusted under 35 U.S.C. 154(b) by 0 days.

(21) Appl. No.: 18/283,480

(22) PCT Filed: Mar. 22, 2022

(86) PCT No.: PCT/US2022/021335
§ 371 (c)(1),
(2) Date: Sep. 22, 2023

(87) PCT Pub. No.: WO2022/204136
PCT Pub. Date: Sep. 29, 2022

(65) Prior Publication Data
US 2024/0183473 A1    Jun. 6, 2024

Related U.S. Application Data

(60) Provisional application No. 63/164,005, filed on Mar. 22, 2021.

(51) Int. Cl.
*F16L 23/08*    (2006.01)

(52) U.S. Cl.
CPC .................................. *F16L 23/08* (2013.01)

(58) Field of Classification Search
CPC ...................................................... F16L 23/08
(Continued)

(56) References Cited

U.S. PATENT DOCUMENTS 2,269,664 A * 1/1942 Hallerberg .............. F16L 23/08
55/502
2,283,179 A * 5/1942 Buckingham ......... F16L 13/128
24/279

(Continued)

FOREIGN PATENT DOCUMENTS

JP    2006064144 A    3/2006

OTHER PUBLICATIONS

International Search Report and Written Opinion for Application No. PCT/US2022/21335, dated Aug. 24, 2022, 12 pages.

(Continued)

*Primary Examiner* — David Bochna
(74) *Attorney, Agent, or Firm* — Brooks Kushman P.C.

(57) ABSTRACT

A clamp assembly is provided with a band having a length sized to wrap about a joint. A plurality of retainer segments is attached to the band to engage a peripheral flange of a pair of tube ends at the joint. A first threaded fastener is connected to the band at a first location. A second threaded fastener is sized to engage the band at a second location to extend to the first threaded fastener to fasten to the first threaded fastener upon rotation of the second threaded fastener to tighten the band and the plurality of retainer segments to clamp the joint.

23 Claims, 8 Drawing Sheets

(58) Field of Classification Search
USPC .................................. 285/367, 410, 411, 420
See application file for complete search history.

(56) References Cited

U.S. PATENT DOCUMENTS

| | | | | |
|---|---|---|---|---|
| 2,688,170 A * | 9/1954 | Balzer | ..................... | F16L 23/10 |
| | | | | 285/410 |
| 2,697,570 A * | 12/1954 | Snyder | ..................... | F16L 23/08 |
| | | | | 248/637 |
| 2,897,569 A * | 8/1959 | Kastner | ..................... | F16L 23/08 |
| | | | | 24/279 |
| 3,235,293 A * | 2/1966 | Condon | ................... | F16L 49/04 |
| | | | | 285/423 |
| 3,298,698 A * | 1/1967 | Condon | ................... | F16L 25/14 |
| | | | | 285/911 |
| 3,455,582 A * | 7/1969 | Von Hoevel | ............ | F16L 23/10 |
| | | | | 285/302 |
| 4,784,202 A * | 11/1988 | White | ................... | B60C 17/041 |
| | | | | 285/411 |
| 5,145,273 A | 9/1992 | Hellon et al. | | |
| 5,570,499 A * | 11/1996 | Katayama | ............... | F16L 23/08 |
| | | | | 411/116 |
| 7,334,975 B2 | 2/2008 | Jungman et al. | | |
| 9,133,875 B2 | 9/2015 | Richards | | |
| 10,228,084 B2 | 3/2019 | Vosgeois et al. | | |
| 2011/0018263 A1 | 1/2011 | Ignaczak et al. | | |
| 2013/0334815 A1* | 12/2013 | Kayacik | ................. | F16L 23/08 |
| | | | | 285/420 |
| 2014/0007385 A1* | 1/2014 | Rigollet | ................. | F16L 23/08 |
| | | | | 24/280 |

OTHER PUBLICATIONS

International Preliminary Report on Patentability for Application No. PCT/US2022/021335, dated Sep. 12, 2023, 9 pages.

Bobby Kimbrough, Everything You Need To Know About V-Band Clamps, https://www.enginelabs.com/author/bjpowertv/, dated May 28, 2014, 11 pages.

Maclean-Fogg Component Solutions, Fastener Components: Maynard Improved Lockthread, Applicant Admitted Prior Art, www.macleanfoggcs.com, 2 pages.

* cited by examiner

CLAMP ASSEMBLY

CROSS-REFERENCE TO RELATED APPLICATIONS

This application is a U.S. national phase of PCT Application No. PCT/US2022/021335 filed Mar. 22, 2022, which claims the benefit of U.S. provisional application Ser. No. 63/164,005 filed Mar. 22, 2021, the disclosures of which are hereby incorporated in their entirety by reference herein.

TECHNICAL FIELD

Various embodiments relate to clamp assemblies for tube ends.

BACKGROUND

The prior art has provided clamp assemblies with a band a plurality of retainer segments for attaching tube ends with tapered flanges.

SUMMARY

According to an embodiment, a clamp assembly is provided with a band having a length sized to wrap about a joint. A plurality of retainer segments is attached to the band to engage a peripheral flange of a pair of tube ends at the joint. A first threaded fastener is connected to the band at a first location. A second threaded fastener is sized to engage the band at a second location to extend to the first threaded fastener to fasten to the first threaded fastener upon rotation of the second threaded fastener to tighten the band and the plurality of retainer segments to clamp the joint.

According to a further embodiment, the first threaded fastener is further provided with a barrel nut with a threaded aperture formed transversely through a cylindrical body of the barrel nut.

According to an even further embodiment, the band is further provided with a loop formed at the first location. The barrel nut is pivotally retained within the loop.

According to another even further embodiment, a slot is formed transversely through the loop. The barrel nut is further provided with an enlarged diameter about a central region of the cylindrical body sized to be received within the slot for retention of the barrel nut within the loop. The threaded aperture is formed through the central region.

According to another even further embodiment, the loop surrounds a majority of the barrel nut so that the barrel nut can pivot within the loop. The barrel nut is further provided with a radial projection extending along a length of the cylindrical body to limit rotation of the barrel nut relative to the loop.

According to another even further embodiment, the loop is further defined as a first loop. The band is further provided with a second loop formed at the second location. A trunnion is retained in the loop. The second threaded fastener is further provided with a bolt with a shank with an externally threaded region extending through the trunnion to engage the barrel nut.

According to an even further embodiment, the bolt is further provided with a head that is oversized relative to the shank. A collar is retained on the shank between the head and the externally threaded region.

According to another even further embodiment, the collar is attached to the trunnion to retain the bolt to the clamp assembly.

According to another further embodiment, the second threaded fastener is further provided with a bolt with a shank with an externally threaded region.

According to an even further embodiment, the externally threaded region is provided with an initial threaded region with a first inner diameter within the threads sized to engage the first threaded fastener. A subsequent threaded region has a second inner diameter greater than the first inner diameter sized to engage the first threaded fastener with an interference fit to retain the bolt to the first threaded fastener.

According to another even further embodiment, the band is further provided with a loop formed at the second location. The clamp assembly is further provided with a trunnion retained in the loop to receive the bolt.

According to another even further embodiment, the bolt is further provided with a head that is oversized relative to the shank. The clamp assembly is further provided with a collar retained on the shank between the head and the externally threaded region.

According to another even further embodiment, the collar is attached to the trunnion to retain the bolt to the clamp assembly.

According to another further embodiment, each of the plurality of retainer segments include a recess that is open centrally inward and tapered decreasing radially outward to engage and clamp tapered flanged tube ends.

According to another embodiment, a method of assembling a joint, wraps a band with a plurality of retainer segments about a pair of tube ends. A first threaded fastener that is retained to the band is engaged to a second threaded fastener that is also retained to the band. The first threaded fastener is tightened to constrict the band and the plurality of retainer segments to clamp the pair of tube ends.

According to another embodiment, a method of manufacturing a clamp assembly installs a cylindrical collar on a shank of a bolt. Threads are formed in the bolt with an outside diameter greater than an inner diameter of the cylindrical collar to retain the cylindrical collar on the bolt. The cylindrical collar is pressed onto a trunnion on a clamp assembly to retain the cylindrical collar and the bolt on the clamp assembly.

According to a further embodiment, the trunnion is installed to a first end of a band with a plurality of retainer segments. A barrel nut is installed to a second end of the band.

According to an even further embodiment, a loop is formed in the second end of the band with a transverse slot through the loop. The barrel nut is formed with an enlarged central region sized to extend into the transverse slot to retain the barrel nut within the loop.

According to another even further embodiment, a loop is formed in the second end of the band to partially enclose an outer diameter of the barrel nut. A lengthwise projection is formed along the barrel nut to engage the loop to limit a pivotal range of the barrel nut within the loop.

According to another embodiment, a method of assembling a joint, manufactures a clamp assembly from a method by installing a cylindrical collar on a shank of a bolt. Threads are formed in the bolt with an outside diameter greater than an inner diameter of the cylindrical collar to retain the cap on the bolt. The cylindrical collar is pressed onto a trunnion on the clamp assembly to retain the cylindrical collar and the bolt on the clamp assembly. The trunnion is installed to a first end of a band with a plurality of retainer segments. A barrel nut is installed to a second end of the band. The band is wrapped about a pair of tube ends. The bolt is engaged to the barrel nut. The bolt is tightened to constrict the band and the plurality of retainer segments to clamp the pair of tube ends.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
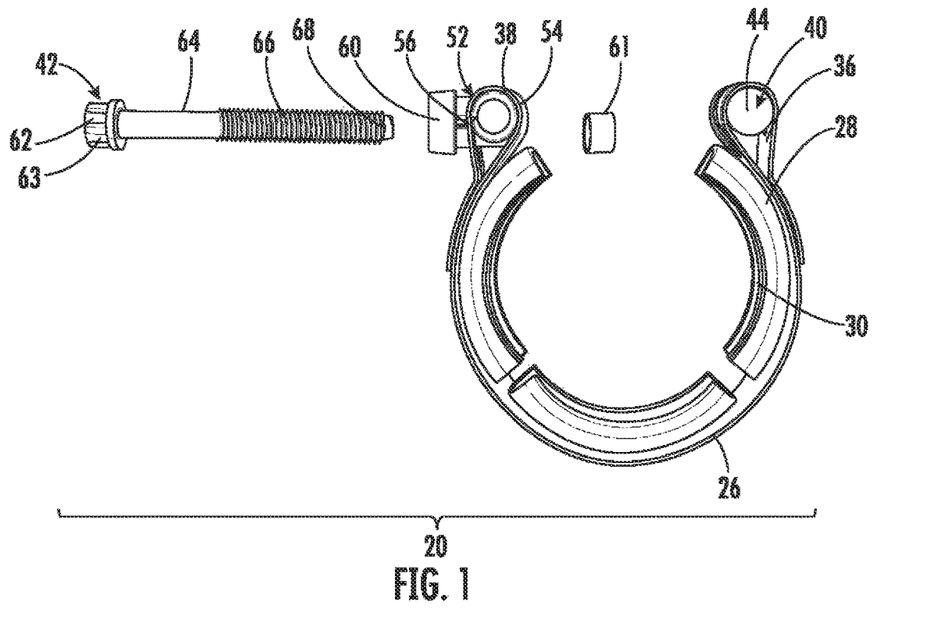
FIG. 1 is an exploded axial perspective view of a clamp assembly according to an embodiment.
Figure 2:
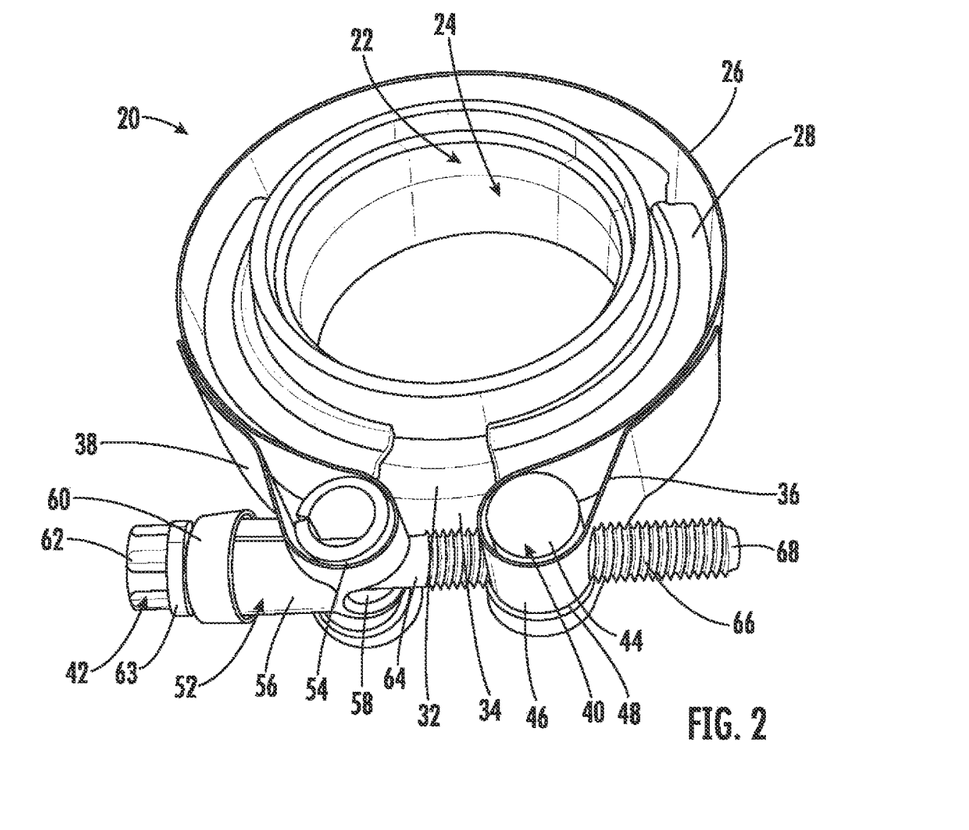
FIG. 2 is an axial perspective view of the clamp assembly of FIG. 1 in cooperation with a pair of tube ends.

FIGS. 1 and 2 illustrate a clamp assembly 20 according to an embodiment. The clamp assembly 20 is utilized for clamping a pair of tube ends 22, 24 (FIG. 2) together as a joint for fluid communication therethrough from one tube to the other. In the depicted embodiment, the tube ends 22, 24 are pipe ends 22, 24 that are joined together at the coterminal ends for conveying fluid between a pair of pipes, such as gas and liquid. One such example of conveyed fluids is exhaust gases. Although pipes are illustrated, the tube ends 22, 24 could be any tube, such as a pipe, hose, or the like. In the depicted embodiments, the tube ends 22, 24 have a round cross-section, however, any tubular cross-section may be employed.

The clamp assembly 20 includes a band 26 with a length that is sized to wrap around a majority of a periphery of the pipe ends 22, 24 to connect the pipe ends 22, 24 to form a fluid joint or coupling. In the depicted embodiment, the band 26 wraps around more than three quadrants of the pipe ends 22, 24. The band 26 is formed from a flexible, yet resilient material, such as a thin sheet metal, such as a steel alloy or the like.

According to an embodiment, a plurality of retainer segments 28 may be provided within an inner periphery of the band 26. Each of the retainer segments 28 are formed from a resilient material, such as a steel alloy or the like. In the depicted embodiment, the retainer segments 28 are fastened to the band 26 by welding or the like. The retainer segments 28 are spaced apart circumferentially to permit flexibility of the band 26 that is otherwise limited by the stiffness of the retainer segments 28. In the depicted embodiment, three retainer segments 28 are illustrated, however, any number of retainer segments 28 may be utilized.

The retainer segments 28 each include a recess 30 formed therein, and open-faced centrally, and radially inward. The recesses 30 are tapered decreasing radially outward. The recesses 30 have a V-shaped cross section; and tube clamp assemblies of this embodiment are often referred to as V-band clamps. The pipe ends 22, 24 each include a peripheral flange 32, 34 at the terminal end. The peripheral flanges 32, 34 are often tapered to decrease in thickness radially outward as well. As the band 26 is tightened, an equally distributed hoop force is applied radially inward upon the retainer segments 28. The retainer segments 28 are forced radially inward, and into engagement with the peripheral flanges 32, 34. The tapered recesses 30 engage the peripheral flanges 32, 34, which are forced together to thereby clamp the pipe ends 22, 24 axially together for a secure and fluid-tight joint.

The band 26 includes a pair of loops 36, 38 at the ends of the band 26 to receive fasteners 40, 42 for clamping the clamp assembly 20 about the pipe ends 22, 24. Each loop 36, 38 is bent to return to the band 26 and is welded to the band 26 to maintain the loop 36, 38. The first loop 36, retains the first fastener 40, which is embodied as a threaded nut, and for the depicted embodiment, as a barrel nut 40. The barrel nut 40 has a generally cylindrical body 44 that is sized to be received in the first loop 36.

Figure 3:
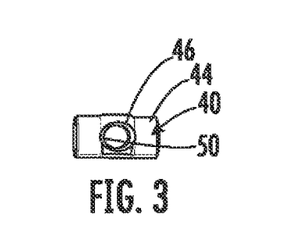
FIG. 3 is a side perspective view of a fastener of the clamp assembly of FIG. 1.

With reference now to FIG. 3, the barrel nut 40 also includes a central region 46 with an enlarged diameter relative to the barrel nut body 44. Referring again to FIG. 2, a slot 48 is formed transversely through the first loop 36. The slot 48 has a width corresponding to an axial length of the central region 46 of the barrel nut body 44. Upon installation of the barrel nut 40 into the first loop 36, the central region 46 of the barrel nut 40 extends at least partially into the slot 48 to retain the barrel nut 40 axially within the first loop 36. The cooperation of the barrel nut 40 within the first loop 36 permits the barrel nut 40 to pivot relative to the first loop 36 for pivoting of the barrel nut 40 during a clamping operation. The barrel nut 40 also includes a threaded aperture 50 formed radially through the central region 46 of the barrel nut 40 as illustrated in FIG. 3.

FIGS. 1 and 2 illustrate that a trunnion 52 is provided with a pair of transverse posts 54 extending from opposed sides of a sleeve 56. The sleeve 56 extends perpendicularly from the pair of posts 54. The trunnion 52 may be formed integrally from a stamped steel alloy. The trunnion 52 is tubular so that the sleeve 56 is hollow. The posts 54 may also be formed hollow. The posts 54 are disposed within the second loop 38. A slot 58 is formed transversely through the second loop 38 to provide clearance for the sleeve 56 to pass through the slot 58. The trunnion 52 is pivotal relative to the second loop 38 about the posts 54 for adjustment and alignment of the sleeve 56 relative to the barrel nut 40 in the first loop 36.

A cap 60 may also be provided on a distal end of the sleeve 56 for partially enclosing the sleeve 56. The cap 60 and/or the bolt 42 may include a retention feature to retain the bolt 42 from disassembly from the trunnion 52. The retention feature may include a retainer ring 61 (FIG. 1) within the cap 60, or about the bolt 42. Therefore, the bolt 42 is not inadvertently disassembled from the trunnion 52 when the bolt 42 is disengaged from the barrel nut 40.

Figure 4:
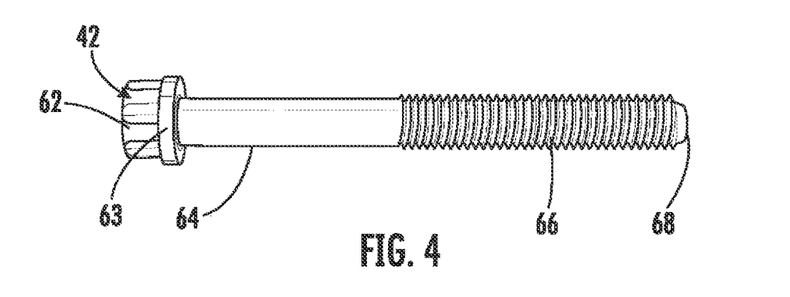
FIG. 4 is a side perspective view of another fastener of the clamp assembly of FIG. 1.

The bolt 42 is illustrated in greater detail in FIG. 4. The second fastener 42 is a bolt 42 with a head 62, for rotating and tightening the bolt 42. The fastener head 62 may have any suitable form, such as a hexagonal head 62 with a flange 63. A shank 64 extends from the head 62 with a threaded region 66 spaced apart from the head 62. The shank 64 is inserted through the sleeve 56 of the trunnion 52 to extend across an opening in the band 26 to the first loop 36 to engage the barrel nut 40. The bolt 42 includes a leading surface 68 with a reduced diameter at the distal end to assist in alignment of the bolt shank 64 with the threaded aperture 50 of the barrel nut 40. The leading surface 68 is often referred to as a dog point. The flange 63 engages the cap 60 of the trunnion 52.

The externally threaded region 66 of the bolt 42 has an outer diameter for the threads, and an inner diameter within the threads. These dimensions may be sized so that the bolt 42 is locked to the barrel nut 40, as is known in the art. For example, the inner diameter of the shank 64 may be oversized in the threaded region 66, known as a truncated thread root, to provide an interference fit within the barrel nut 40. Any torque locking or retention feature may be employed for securing the bolt 42 and the barrel nut 40. Alternatively, any free-running or non-locking thread may be utilized as well.

During assembly, the pair of pipe ends 22, 24 are aligned. The band 26 is wrapped around the pipe ends 22, 24. The retainer segments 28 are aligned with the pipe flanges 32, 34. Then the bolt 42 is aligned with the barrel nut 40, inserted into the barrel nut 40, and tightened. The tightened fasteners 40, 42 clamp the joint of the pair of tube ends 22, 24.

Figure 5:
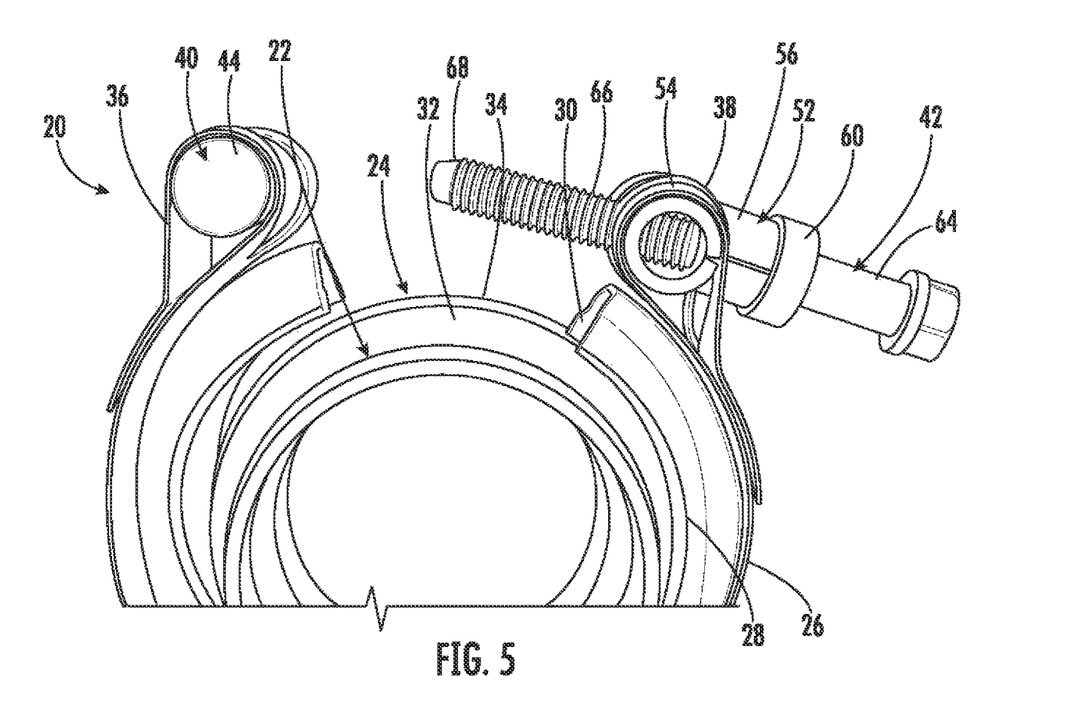
FIG. 5 is an axial perspective view of the clamp assembly of FIG. 1, in cooperation with the pair of tube ends, illustrated in an assembly step.

FIG. 5 illustrates an assembly step of the clamp assembly 20. The pipe ends 22, 24 are aligned and abutted. The clamp assembly 20, when disassembled, constrains the fasteners 40, 42. As explained above, the barrel nut 40 is retained in the first band loop 36. Likewise, the bolt 42 is retained in the trunnion 52 by a retention feature in the cap 60 and/or on the bolt 42. In contrast, prior art V-band clamp assemblies utilize a T-bolt that is inserted through the trunnion, and then a separate nut is applied to a distal end of the T-bolt. The nut is separated from the prior art clamp assembly until after the T-bolt is inserted through the trunnion. The clamp assembly 20 retains the fasteners 40, 42 when disassembled in order to simplify the installation, while avoiding loss or misplacement of components.

Figure 6:
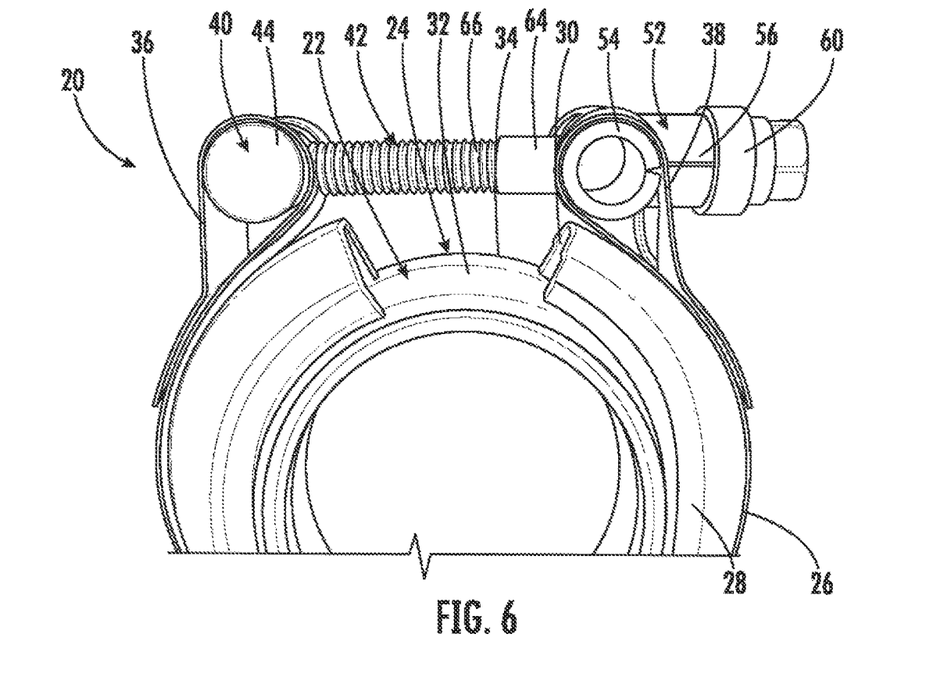
FIG. 6 is an axial perspective view of the clamp assembly and the pair of tube ends of FIG. 5, illustrated in an intermediate assembly step.
Figure 7:
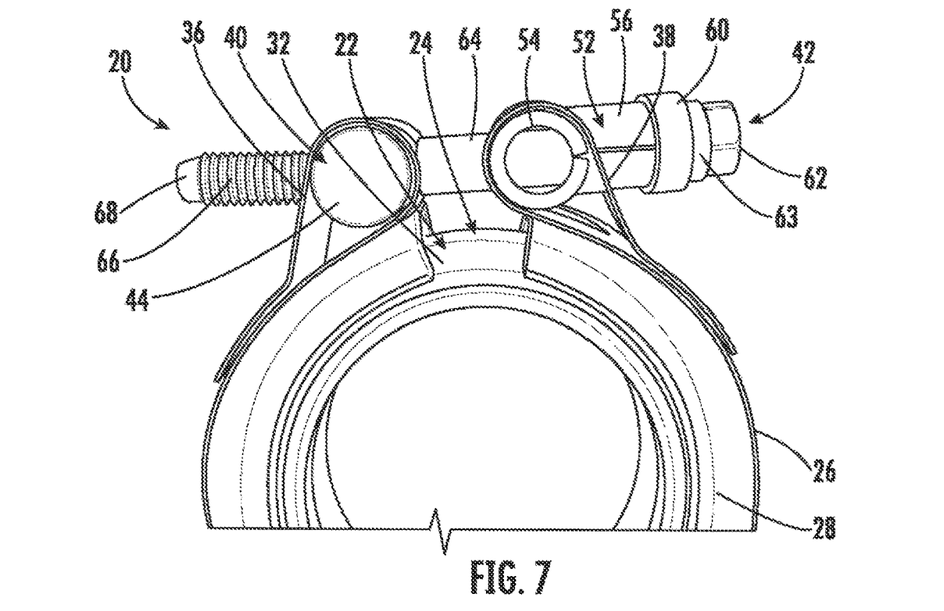
FIG. 7 is an axial perspective view of the clamp assembly and the pair of tube ends of FIG. 5, illustrated assembled.
Figure 8:
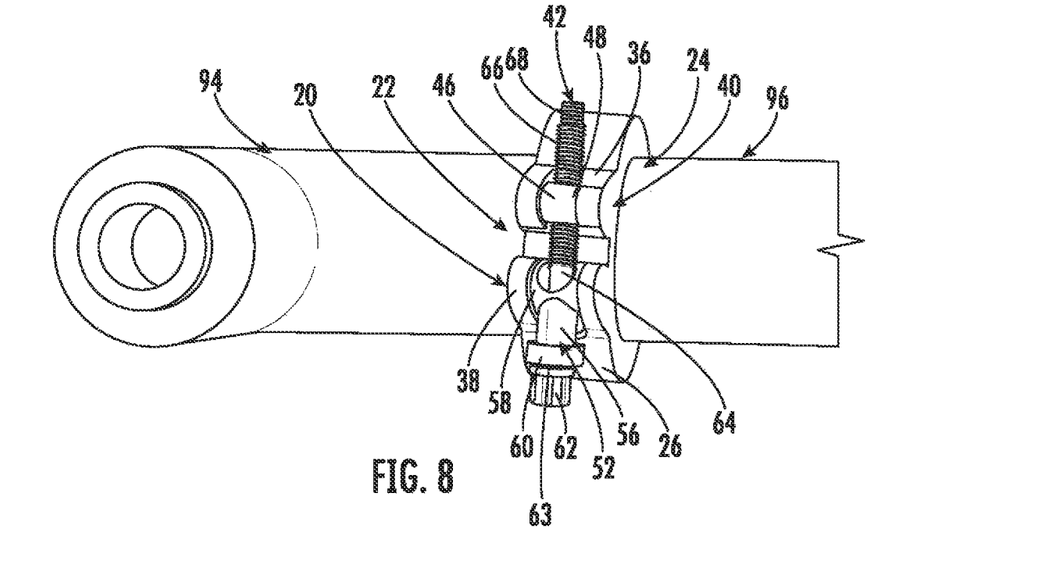
FIG. 8 is a top perspective view of a joint assembly with the clamp assembly of FIG. 1 according to an embodiment.
Figure 9:
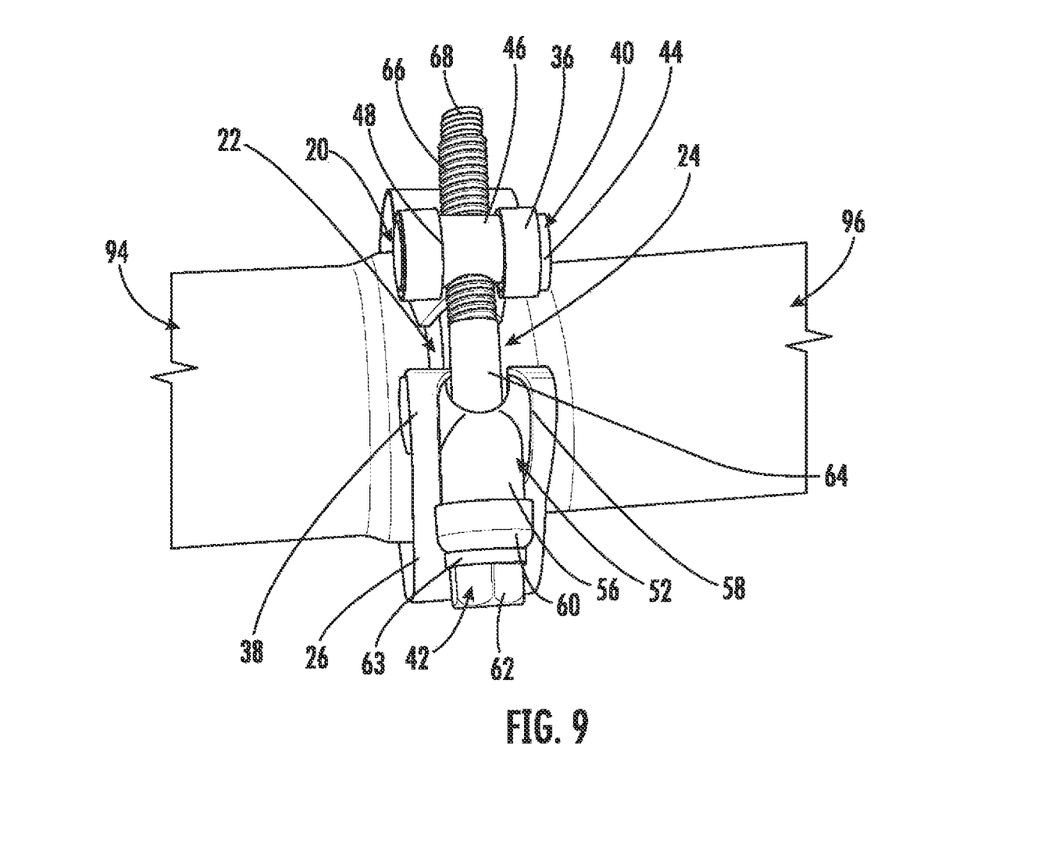
FIG. 9 is an enlarged top perspective view of the joint assembly and the clamp assembly of FIG. 8.
Figure 10:
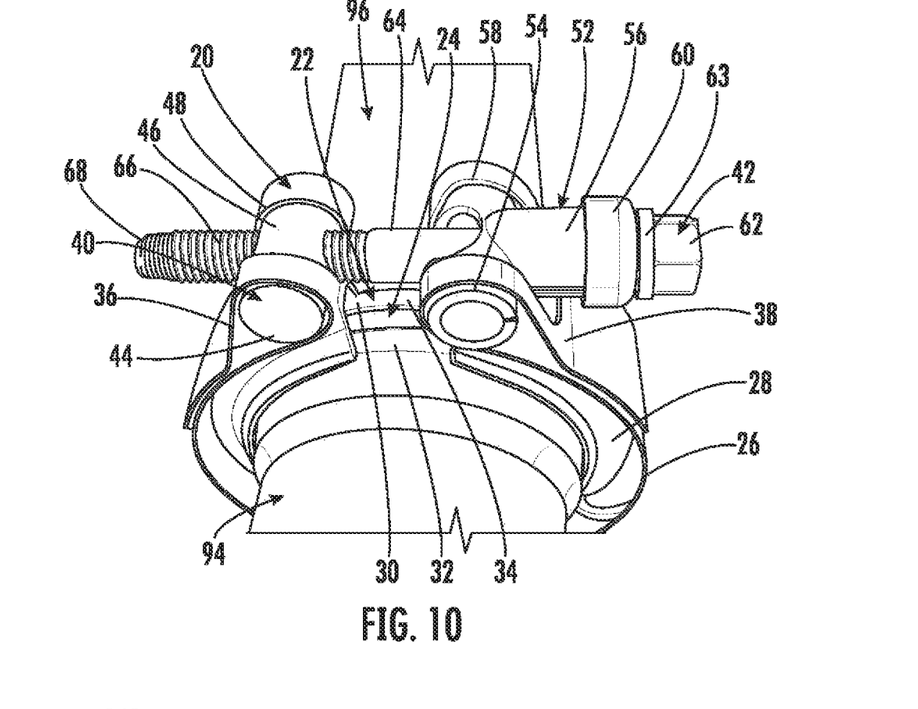
FIG. 10 is an enlarged axial perspective view of the joint assembly and the clamp assembly of FIG. 8.

The retainer segments 28 are aligned with the pipe flanges 32, 34 and the band 26 is closed. The bolt 42 is aligned with the barrel nut 40. Then, the dog point 68 of the bolt 42 is inserted into the barrel nut 20 as illustrated in FIG. 6, and then the bolt 42 is tightened. The bolt 42 is tightened by a tool, such as a socket driver, wrench, or the like. FIG. 7 illustrates the clamp assembly 20 tightened as a fluid pipe joint thereby securing and sealing the pipe ends 22, 24. FIGS. 8-10 illustrate the clamp assembly 20 installed upon pipe ends 22, 24 of pipes 94, 96. The pipes 94, 96 may be any fluid pipes such as powertrain, turbine, exhaust, water, oil, gas, pool water, or the like. The clamp assembly 20 provides a secure locked joint that withstands the heat, pressure and vibrations associated with fluid connections.

Referring to FIGS. 7-10, the bolt 42 is oriented such that each end 62, 68 of the bolt 42 is aligned near an outside diameter or dimension of the band 26. The prior art V-band assemblies translate the T-bolt in one direction through the trunnion such that a distal end of T-bolt extends significantly outside an outer diameter of the band. The clamp assembly 20 is more compact than the prior art, avoiding interferences with adjacent components. The compact clamp assembly 20 minimizes inadvertent contact with other functional components such as fuel rails. Additionally, the compactness makes clearance for ornamental components, such as decorative engine covers, or the like. Therefore, the compact clamp assembly 20 also improves an ornamental appearance of the fluid coupling.

Prior art V-band assemblies include T-bolts that are formed with uneven surfaces, causing stress peaks in the band, which may result in failures. The stress peaks are eliminated by the barrel nut 40 due to tighter tolerances of the barrel nut body 44, which may be obtained by machining of the barrel nut body 44.

Figure 11:
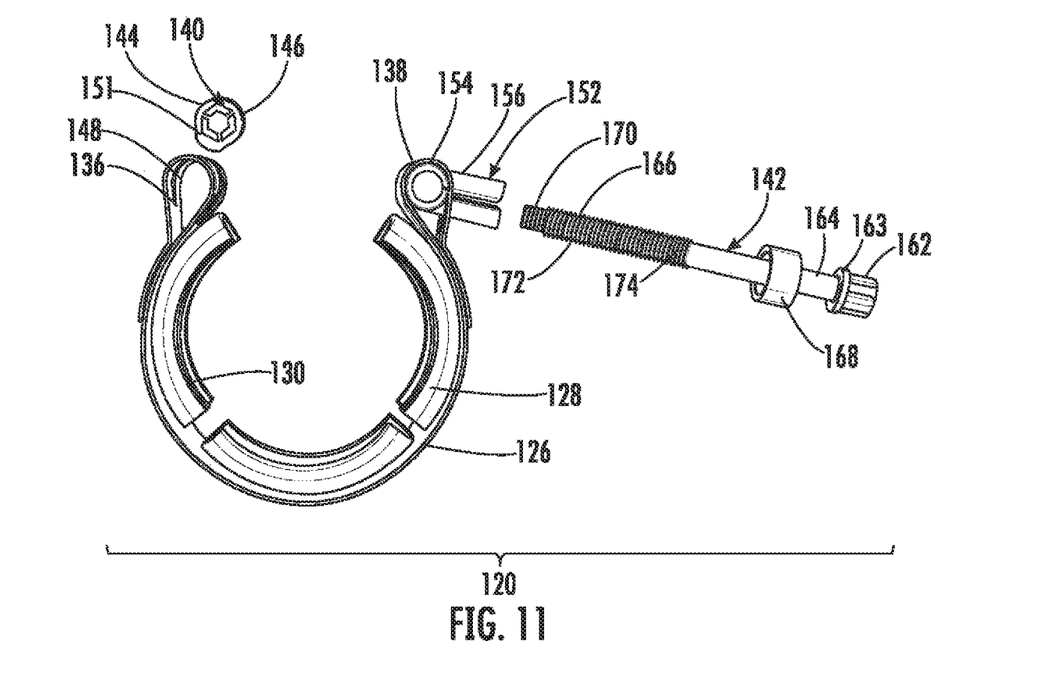
FIG. 11 is an exploded axial perspective view of a clamp assembly according to another embodiment.
Figure 12:
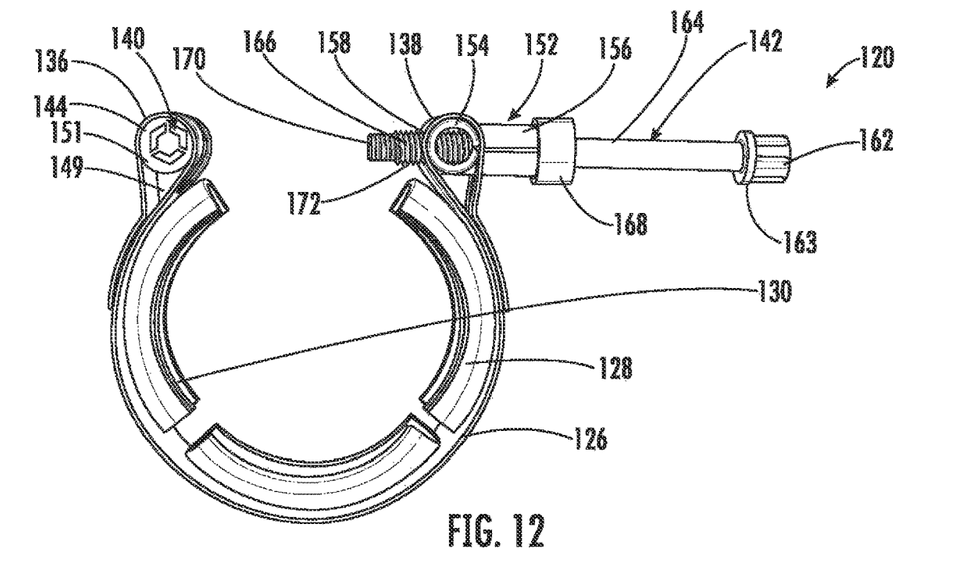
FIG. 12 is an axial perspective view of the clamp assembly of FIG. 11.

FIGS. 11 and 12 illustrate a clamp assembly 120 according to another embodiment. The clamp assembly 120 is utilized clamping a pair of tube ends together as a joint for fluid communication therethrough from one tube to the other. The clamp assembly 120 includes a band 126 with a length that is sized to wrap around a majority of a periphery of the pipe ends to connect the pipe ends to form a fluid joint or coupling. The band 126 is formed from a flexible, yet resilient material, such as a thin sheet metal, such as a steel alloy or the like.

According to an embodiment, a plurality of retainer segments 128 may be provided within an inner periphery of the band 126. Each of the retainer segments 128 are formed from a resilient material, such as a steel alloy or the like. In the depicted embodiment, the retainer segments 128 are fastened to the band 126 by welding or the like. The retainer segments 128 are spaced apart circumferentially to permit flexibility of the band 126 that is otherwise limited by the stiffness of the retainer segments 128. In the depicted embodiment, three retainer segments 128 are illustrated, however, any number of retainer segments 128 may be utilized.

The retainer segments 128 each include a recess 130 formed therein, and open-faced centrally, and radially inward. The recesses 130 are tapered decreasing radially outward. The recesses 130 have a V-shaped cross section; and tube clamp assemblies of this embodiment are often referred to as V-band clamps.

The band 126 includes a pair of loops 136, 138 at the ends of the band 126 to receive fasteners 140, 142 for clamping the clamp assembly 120 about the pipe ends. Each loop 136, 138 is bent to return to the band 126 and is welded to the band 126 to maintain the loop 136, 138. The first loop 136, retains the first fastener 140, which is embodied as a threaded nut, and for the depicted embodiment, as a barrel nut 140. The barrel nut 140 has a generally cylindrical body 144 that is sized to be received in the first loop 136.

Figure 13:
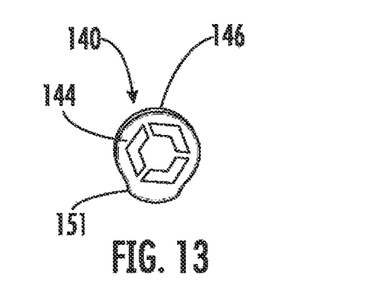
FIG. 13 is an enlarged axial end view of a barrel nut of the clamp assembly of FIG. 11.
Figure 14:
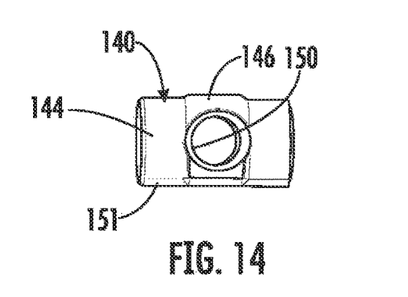
FIG. 14 is an enlarged transverse side view of the barrel nut of FIG. 13.

With reference now to FIGS. 13 and 14, the barrel nut 140 is illustrated in greater detail. The barrel nut 140 may be formed from a metal alloy, and may be fabricated by any suitable method, such as cold-forming and machining operations. The barrel nut 140 also includes a central region 146 with an enlarged diameter relative to the barrel nut body 144. Referring again to FIG. 11, a slot 148 is formed transversely through the first loop 136. The slot 148 has a width corresponding to an axial length of the central region 146 of the barrel nut body 144. Upon installation of the barrel nut 140 into the first loop 136, the central region 146 of the barrel nut 140 extends at least partially into the slot 148 to retain the barrel nut 140 axially within the first loop 136. The cooperation of the barrel nut 140 within the first loop 136 permits the barrel nut 140 to pivot relative to the first loop 136 for pivoting of the barrel nut 140 during a clamping operation. The barrel nut 140 also includes a threaded aperture 150 formed radially through the central region 146 of the barrel nut 140 as illustrated in FIG. 14.

As illustrated in FIG. 12, the first loop 136 wraps around a majority of the body 144 of the barrel nut 140. The first loop 136 returns to the band 126, thereby generating a gap 149 between the first loop 136, the band 126 and the barrel nut 140. FIGS. 13 and 14 demonstrate that the barrel nut 140 includes a lengthwise projection 151 extending radially outward beyond the diameter of the body 144. Referring again to FIG. 12, the projection 151 extends into the gap 149 to limit rotation of the barrel nut 140 within the loop 136. The limited rotation of the barrel nut 140 maintains an orientation of the barrel nut 140, and consequently aligns the orientation of the threaded aperture 150 for receipt of the second fastener 142. By facing the threaded aperture 150 toward the second fastener 142, assembly is simplified by easing an alignment of the threaded aperture 150 and the second fastener 142. Although rotation of the barrel nut 140 is limited, the projection 151 is sized to provide clearance within the gap 149 to permit the barrel nut 140 to pivot as the clamp assembly 120 is tightened.

FIGS. 11 and 12 illustrate that a trunnion 152 is provided with a pair of transverse posts 154 extending from opposed sides of a sleeve 156. The sleeve 156 extends perpendicularly from the pair of posts 154. The trunnion 152 may be formed integrally from a stamped steel alloy. The trunnion 152 is tubular so that the sleeve 156 is hollow. The posts 154 may also be formed hollow. The posts 154 are disposed within the second loop 138. A slot 158 is formed transversely through the second loop 138 to provide clearance for the sleeve 156 to pass through the slot 158. The trunnion 152 is pivotal relative to the second loop 138 about the posts 154 for adjustment and alignment of the sleeve 156 relative to the barrel nut 140 in the first loop 136.

Figure 15:
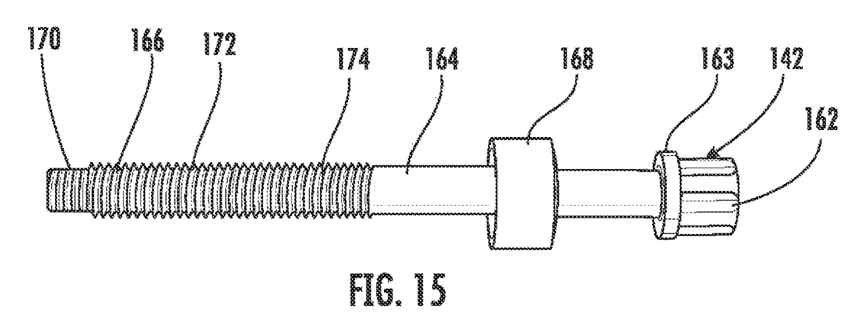
FIG. 15 is a side elevation view of a fastener assembly of the clamp assembly of FIG. 11.

The bolt 142 is illustrated in greater detail in FIG. 15. The second fastener 142 is a bolt 142 with a head 162, for rotating and tightening the bolt 142. The fastener head 162 may have any suitable form for driving the fastener 142, such as a socket drive head 162 with a flange 163. A shank 164 extends from the head 162 with a threaded region 166 spaced apart from the head 162.

A cylindrical collar 168 is provided on the shank 164. The collar 168 is installed on the shank 164 prior to a manufacturing process that forms the threaded region 166. For example, the bolt 142 may undergo a thread-rolling operation. Once threaded, an outer diameter of the threaded region 166 is greater than an inner diameter of the collar 168 to retain the collar 168 upon the shank 164. The collar 168 may translate and rotate upon the unthreaded shank 164 between the flange 163 and the threaded region 166.

FIG. 11 illustrates the bolts 142 and the collar 168 prior to installation to the trunnion 152. The collar 168 may formed from any suitable material, such as a steel alloy; and the collar 168 may be formed from any suitable process, such as machining, stamping, or the like. The collar 168 is pressed onto an end of the sleeve 156 of the trunnion 152 as illustrated in FIG. 12. The collar 168 provides a cap 168 for the trunnion 152, partially enclosing the sleeve 156, while retaining the bolt 142 to the trunnion 152. The bolt 142 can rotate relative to the trunnion 152 and has limited translation relative to the trunnion 152. The bolt 142 can be slid into engagement with the barrel nut 140 and rotated relative to the trunnion 152 and the barrel nut 140 for clamping the clamp assembly 120. The flange 163 engages the cap 168 of the trunnion 152 as an axial resistant surface while the bolt 142 is under tension. The retention of the bolt 142 avoids inadvertent disassembly of the bolt 142 from the trunnion 152 when the bolt 142 is disengaged from the barrel nut 140.

The shank 164 extends through the sleeve 156 of the trunnion 152 to extend across an opening in the band 126 to the first loop 136 to engage the barrel nut 140. The bolt 142 includes a leading surface 170 with a reduced diameter at the distal end to provide a pilot point to assist in alignment of the bolt shank 164 with the threaded aperture 150 of the barrel nut 140. The leading surface 170 of the bolt has a diameter that is slightly oversized compared to standard pilot points, to minimize potential cross-threading of the barrel nut 140.

With reference again to FIG. 15, the externally threaded region 166 of the bolt 142 has an initial threaded region 172 with an outer diameter for the threads, and an inner diameter within the threads. These dimensions within the initial threaded region 172 may be sized so that the bolt 142 is engaged within the barrel nut 140 with minimal torque, known as a free-running thread 172. The externally threaded region 166 of the bolt 142 also has a secondary threaded region 174 with an outer diameter for the threads, and an inner diameter within the threads. The dimensions of the secondary threaded region 174 may be sized so that the bolt 142 is locked to the barrel nut 140, as is known in the art. For example, the inner diameter of the shank 164 may be oversized in the secondary threaded region 174, known as a truncated thread root, to provide an interference fit within the barrel nut 140.

During assembly, a first minimal torque is required to turn the bolt 142, to begin the clamping of the clamp assembly 120 while the barrel nut 140 receives the initial threaded region 172. Since torque is minimized during engagement of the free-running threads 172, friction and heat are also minimized in this region 172. An example of a combination of free-running threads and locking threads is disclosed in FIGS. 2-6 and the accompanying description of Jungman et al., U.S. Pat. No. 7,334,975 B2, which issued to MacLean-Fogg Company on Feb. 26, 2008, and which is incorporated by reference herein. The prior art provides the locking feature of the fasteners of the V-band clamp assemblies on the nut; wherein the disclosed design provides the locking feature on the bolt 142.

Figure 16:
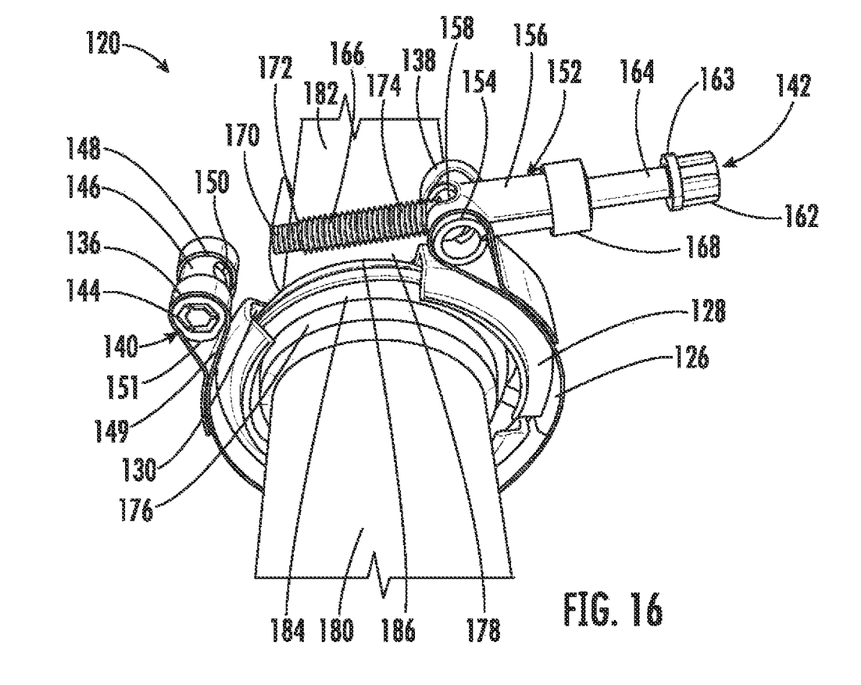
FIG. 16 is a perspective view of the clamp assembly of FIG. 11, in cooperation with a pair of tube ends, illustrated in an assembly step.
Figure 17:
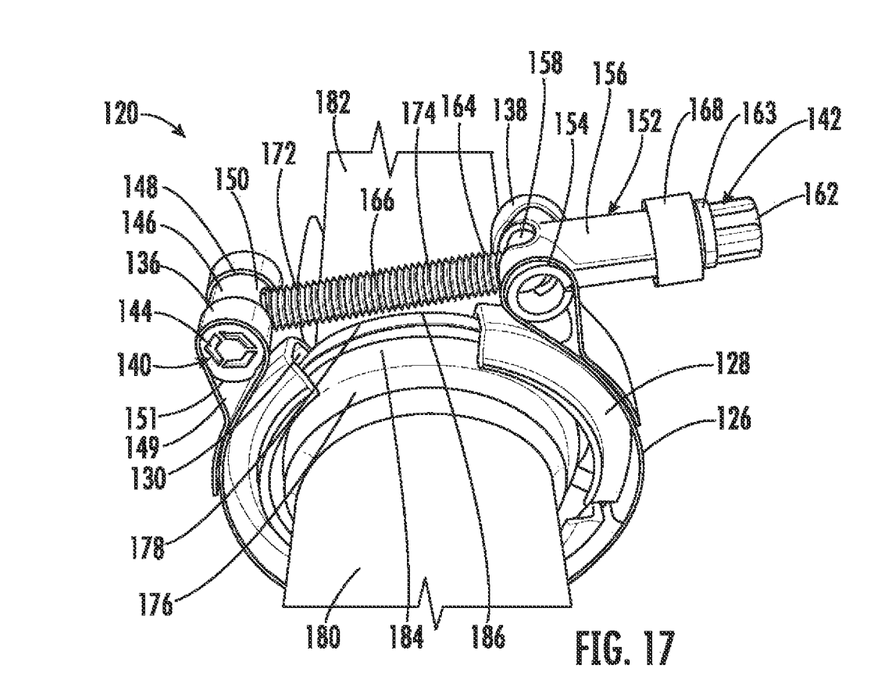
FIG. 17 is a perspective view of the clamp assembly and the pair of tube ends of FIG. 16, illustrated in an intermediate assembly step.
Figure 18:
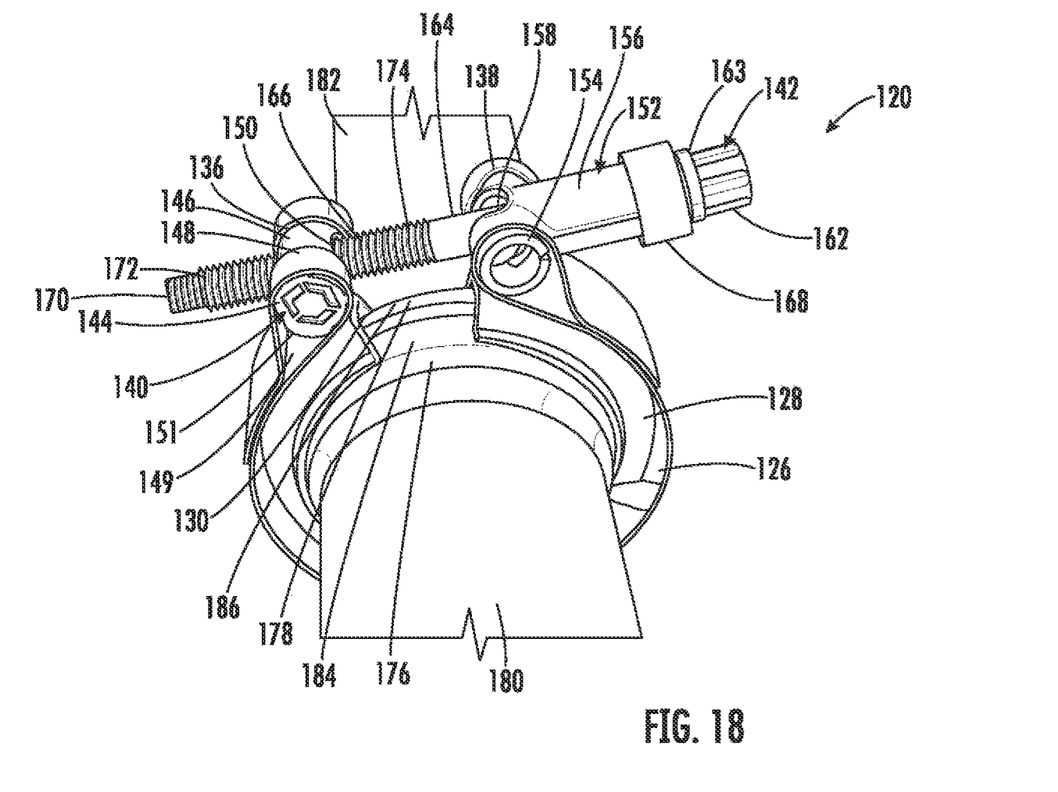
FIG. 18 is a perspective view of the clamp assembly and the pair of tube ends of FIG. 16, illustrated assembled.

FIGS. 16-18 illustrate the clamp assembly 120 in cooperation with a pair of tube ends 176, 178. In the depicted embodiment, the tube ends 176, 178 are pipe ends 176, 178 that are joined together at the coterminal ends of pipes 180, 182 for conveying fluid between a pair of pipes 180, 182, such as gas and liquid. One such example of conveyed fluids is exhaust gases. The pipes 180, 182 may be any fluid pipes such as powertrain, turbine, exhaust, water, oil, gas, pool water, or the like. Although pipes are illustrated, the tube ends 176, 178 could be any tube, such as a pipe, hose, or the like. In the depicted embodiments, the tube ends 176, 178 have a round cross-section, however, any tubular cross-section may be employed.

The pipe ends 176, 178 each include a peripheral flange 184, 186 at the terminal end 176, 178. The peripheral flanges 184, 186 are often tapered to decrease in thickness radially outward as well. During assembly, the pair of pipe ends 176, 178 are aligned and abutted as illustrated in FIG. 16.

The clamp assembly 120, when disassembled, constrains the fasteners 140, 142. As explained above, the barrel nut 140 is retained in the first band loop 136. Likewise, the bolt 142 is retained in the trunnion 152 by the collar 168. In contrast, prior art V-band clamp assemblies utilize a T-bolt that is inserted through the trunnion, and then a separate nut is applied to a distal end of the T-bolt. The nut is separated from the prior art clamp assembly until after the T-bolt is inserted through the trunnion. The clamp assembly 120 retains the fasteners 140, 142 when disassembled in order to simplify the installation, while avoiding loss or misplacement of components.

The band 126 is wrapped around the pipe ends 176, 178. In the depicted embodiment, the band 126 wraps around more than three quadrants of the pipe ends 176, 178. The retainer segments 128 are aligned with the pipe flanges 184, 186 and the band 126 is closed. The bolt 142 is aligned with the barrel nut 140. Then, the pilot point 170 of the bolt 142 is inserted into the barrel nut 120 as illustrated in FIG. 17, and then the bolt 142 is tightened. The bolt 142 is tightened by a tool, such as a socket driver, wrench, or the like.

As the band 126 is tightened, an equally distributed hoop force is applied radially inward upon the retainer segments 128. The retainer segments 128 are forced radially inward, and into engagement with the peripheral flanges 184, 186. The tapered recesses 130 engage the peripheral flanges 184, 186, which are forced together to thereby clamp the pipe ends 176, 178 axially together for a secure and fluid-tight joint. During the clamping operation, the initial torque of driving the initial threaded region 172 into the barrel nut is minimal for the free-running threads 172. Once the secondary threaded region 174 reaches the barrel nut, an increased torque is required to drive the bolt 142 into the barrel nut 140. Likewise, the increased torque is also required to loosen the clamp assembly 120, thereby locking the bolt 142 into the barrel nut 140.

FIG. 18 illustrates the clamp assembly 120 tightened as a fluid pipe joint thereby securing and sealing the pipe ends 176, 178. The clamp assembly 120 provides a secure locked joint that withstands the heat, pressure and vibrations associated with fluid connections. Once assembled and clamped, the bolt 142 is oriented such that each end 162, 170 of the bolt 142 is aligned near an outside diameter or dimension of the band 126. The prior art V-band assemblies translate the T-bolt in one direction through the trunnion such that a distal end of T-bolt extends significantly outside an outer diameter of the band. The clamp assembly 120 is more compact than the prior art, avoiding interferences with adjacent components. The compact clamp assembly 120 minimizes inadvertent contact with other functional components such as fuel rails. Additionally, the compactness makes clearance for ornamental components, such as decorative engine covers, or the like. Therefore, the compact clamp assembly 120 also improves an ornamental appearance of the fluid coupling.

Prior art V-band assemblies include T-bolts that are formed with uneven surfaces, causing stress peaks in the band, which may result in failures. The stress peaks are eliminated by the barrel nut 140 due to tighter tolerances of the barrel nut body 144, which may be obtained by machining of the barrel nut body 144.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A clamp assembly comprising:
   a band having a length sized to wrap about a joint;
   a plurality of retainer segments attached to the band to engage a peripheral flange of a pair of tube ends at the joint;
   a first threaded fastener connected to the band at a first location; and
   a second threaded fastener sized to engage the band at a second location to extend to the first threaded fastener to fasten to the first threaded fastener upon rotation of the second threaded fastener to tighten the band and the plurality of retainer segments to clamp the joint;
   wherein the first threaded fastener further comprises a barrel nut with a threaded aperture formed transversely through a cylindrical body of the barrel nut;
   wherein the band further comprises a loop formed at the first location;
   wherein the barrel nut is pivotally retained within the loop;
   wherein a slot is formed transversely through the loop;
   wherein the barrel nut further comprises an enlarged diameter about a central region of the cylindrical body sized to be received within the slot for retention of the barrel nut within the loop; and
   wherein the threaded aperture is formed through the central region.

2. The clamp assembly of claim 1 wherein the loop surrounds a majority of the barrel nut so that the barrel nut can pivot within the loop; and
   wherein the barrel nut further comprises a radial projection extending along a length of the cylindrical body to limit rotation of the barrel nut relative to the loop.

3. The clamp assembly of claim 1 wherein the loop is further defined as a first loop;
   wherein the band further comprises a second loop formed at the second location;
   wherein the clamp assembly further comprises a trunnion retained in the loop; and
   wherein the second threaded fastener further comprises a bolt with a shank with an externally threaded region extending through the trunnion to engage the barrel nut.

4. The clamp assembly of claim 3 wherein the bolt further comprises a head that is oversized relative to the shank; and
   wherein the clamp assembly further comprises a collar retained on the shank between the head and the externally threaded region.

5. The clamp assembly of claim 4 wherein the collar is attached to the trunnion to retain the bolt to the clamp assembly.

6. The clamp assembly of claim 1 wherein the second threaded fastener further comprises a bolt with a shank with an externally threaded region.

7. The clamp assembly of claim 6 wherein the externally threaded region comprises:

an initial threaded region with a first outer diameter within the threads sized to engage the first threaded fastener; and a subsequent threaded region with a second outer diameter greater than the first outer diameter sized to engage the first threaded fastener with an interference fit to retain the bolt to the first threaded fastener.

8. The clamp assembly of claim 6 wherein the band further comprises a loop formed at the second location; and
wherein the clamp assembly further comprises a trunnion retained in the loop to receive the bolt.

9. The clamp assembly of claim 8 wherein the bolt further comprises a head that is oversized relative to the shank; and
wherein the clamp assembly further comprises a collar retained on the shank between the head and the externally threaded region.

10. The clamp assembly of claim 9 wherein an outer diameter of the externally threaded region is greater than an inner diameter of the collar to retain the collar upon the shank.

11. The clamp assembly of claim 1 wherein each of the plurality of retainer segments include a recess that is open centrally inward and tapered decreasing radially outward to engage and clamp tapered flanged tube ends.

12. A method of manufacturing a clamp assembly comprising:
installing a cylindrical collar on a shank of a bolt;
forming threads in the bolt with an outside diameter greater than an inner diameter of the cylindrical collar to retain the cylindrical collar on the bolt; and
pressing the cylindrical collar onto a trunnion on a clamp assembly to retain the cylindrical collar and the bolt on the clamp assembly.

13. The method of claim 12 further comprising:
installing the trunnion to a first end of a band with a plurality of retainer segments; and
installing a barrel nut to a second end of the band.

14. The method of claim 13 further comprising:
forming a loop in the second end of the band with a transverse slot through the loop; and
forming the barrel nut with an enlarged central region sized to extend into the transverse slot to retain the barrel nut within the loop.

15. The method of claim 13 further comprising:
forming a loop in the second end of the band to partially enclose an outer diameter of the barrel nut; and
forming a lengthwise projection along the barrel nut to engage the loop to limit a pivotal range of the barrel nut within the loop.

16. A method of assembling a joint comprising:
wrapping a band manufactured according to the method of claim 13, about a pair of tube ends;
engaging the bolt to the barrel nut; and
tightening the bolt to constrict the band and the plurality of retainer segments to clamp the pair of tube ends.

17. A clamp assembly comprising:
a band having a length sized to wrap about a joint;
a plurality of retainer segments attached to the band to engage a peripheral flange of a pair of tube ends at the joint;
a first threaded fastener connected to the band at a first location; and
a second threaded fastener sized to engage the band at a second location to extend to the first threaded fastener to fasten to the first threaded fastener upon rotation of the second threaded fastener to tighten the band and the plurality of retainer segments to clamp the joint;
wherein the first threaded fastener further comprises a barrel nut with a threaded aperture formed transversely through a cylindrical body of the barrel nut;
wherein the band further comprises a loop formed at the first location;
wherein the barrel nut is pivotally retained within the loop;
wherein the loop is further defined as a first loop;
wherein the band further comprises a second loop formed at the second location;
wherein the clamp assembly further comprises a trunnion retained in the loop;
wherein the second threaded fastener further comprises a bolt with a shank with an externally threaded region extending through the trunnion to engage the barrel nut;
wherein the bolt further comprises a head that is oversized relative to the shank; and
wherein the clamp assembly further comprises a collar retained on the shank between the head and the externally threaded region.

18. The clamp assembly of claim 17 wherein the collar is attached to the trunnion to retain the bolt to the clamp assembly.

19. A clamp assembly comprising:
a band having a length sized to wrap about a joint;
a plurality of retainer segments attached to the band to engage a peripheral flange of a pair of tube ends at the joint;
a first threaded fastener connected to the band at a first location; and
a second threaded fastener sized to engage the band at a second location to extend to the first threaded fastener to fasten to the first threaded fastener upon rotation of the second threaded fastener to tighten the band and the plurality of retainer segments to clamp the joint;
wherein the second threaded fastener further comprises a bolt with a shank with an externally threaded region; and
wherein the externally threaded region comprises:
an initial threaded region with a first outer diameter within the threads sized to engage the first threaded fastener, and
a subsequent threaded region with a second outer diameter greater than the first outer diameter sized to engage the first threaded fastener with an interference fit to retain the bolt to the first threaded fastener.

20. A clamp assembly comprising:
a band having a length sized to wrap about a joint;
a plurality of retainer segments attached to the band to engage a peripheral flange of a pair of tube ends at the joint;
a first threaded fastener connected to the band at a first location; and
a second threaded fastener sized to engage the band at a second location to extend to the first threaded fastener to fasten to the first threaded fastener upon rotation of the second threaded fastener to tighten the band and the plurality of retainer segments to clamp the joint; and
wherein the first threaded fastener further comprises a barrel nut with a threaded aperture formed transversely through a cylindrical body of the barrel nut;
wherein the band further comprises a loop formed at the first location;
wherein the barrel nut is pivotally retained within the loop;
wherein the loop surrounds a majority of the barrel nut so that the barrel nut can pivot within the loop; and wherein the barrel nut further comprises a radial projection extending along a length of the cylindrical body to limit rotation of the barrel nut relative to the loop.

21. A clamp assembly comprising:

a band having a length sized to wrap about a joint;

a plurality of retainer segments attached to the band to engage a peripheral flange of a pair of tube ends at the joint;

a first threaded fastener connected to the band at a first location; and a second threaded fastener sized to engage the band at a second location to extend to the first threaded fastener to fasten to the first threaded fastener upon rotation of the second threaded fastener to tighten the band and the plurality of retainer segments to clamp the joint; and wherein the first threaded fastener further comprises a barrel nut with a threaded aperture formed transversely through a cylindrical body of the barrel nut;

wherein the band further comprises a loop formed at the first location;

wherein the barrel nut is pivotally retained within the loop;

wherein the second threaded fastener further comprises a bolt with a shank with an externally threaded region;

wherein the band further comprises a loop formed at the second location;

wherein the clamp assembly further comprises a trunnion retained in the loop to receive the bolt;

wherein the bolt further comprises a head that is oversized relative to the shank; and wherein the clamp assembly further comprises a collar retained on the shank between the head and the externally threaded region.

22. The clamp assembly of claim 20 wherein the radial projection is received within a gap within the loop to limit rotation of the barrel nut relative to the loop.

23. The clamp assembly of claim 21 wherein the collar is attached to the trunnion to retain the bolt to the clamp assembly.

* * * * *